United States Patent [19]

Kolodka

[11] Patent Number: 4,782,909
[45] Date of Patent: Nov. 8, 1988

[54] COLLISION RESISTANT MOTOR VEHICLE

[76] Inventor: Walter Kolodka, Grahamdale, Manitoba, Canada, R0C 1C0

[21] Appl. No.: 98,860

[22] Filed: Sep. 21, 1987

[51] Int. Cl.⁴ .................. B60R 21/00; B60R 27/00
[52] U.S. Cl. ................................ 180/271; 293/43; 293/112; 291/185
[58] Field of Search ............... 180/271; 296/185, 15, 296/1 R; 280/778; 293/112, 118, 119, 42, 43, 45

[56] References Cited

U.S. PATENT DOCUMENTS

| | | | |
|---|---|---|---|
| 532,339 | 1/1895 | Rodgers | 293/43 |
| 545,771 | 9/1895 | Bustin | 293/43 |
| 548,631 | 10/1895 | Doeer | 293/43 |
| 555,382 | 2/1896 | Lafferty | 293/43 |
| 719,256 | 1/1903 | Quern | 293/42 |
| 818,797 | 4/1906 | Stawartz | 293/43 |
| 1,227,458 | 5/1917 | Liebner | 293/46 |
| 1,383,196 | 6/1921 | First | 293/43 |
| 1,487,260 | 3/1924 | Moore | 293/42 |
| 1,697,085 | 1/1929 | Pogve | 293/45 |

Primary Examiner—Richard A. Bertsch
Attorney, Agent, or Firm—Stanley G. Ade; Adrian D. Battison; Murray E. Thrift

[57] ABSTRACT

A motor vehicle including a passenger compartment is rendered collision resistant by a wedge member formed at the front of the vehicle defined by a forward most apex designed to run close to the ground, a rigid pan extending horizontally backwardly from the apex underneath the vehicle and an inclined ramp which extends upwardly and rearwardly from the apex to a position over the passenger compartment. The suspension of the vehicle is arranged so that on engaging an oncoming vehicle or the like the apex is forced downwardly to engage the pan with the ground so that the ramp acts to allow the oncoming vehicle to run up and over the vehicle while the vehicle continues to slide forwardly on skids or rollers on the underside of the pan.

10 Claims, 1 Drawing Sheet

COLLISION RESISTANT MOTOR VEHICLE

This invention relates to a collision resistant motor vehicle which is designed to reduce or avoid damage to the vehicle and to the occupants as a result of a head on collision between the vehicle and another vehicle.

Head on collisions between vehicles are of course more serious in many cases than other collisions because the approach speed between the vehicles is the sum of the individual speeds of the vehicles. In such cases even recent designs of vehicle which include rigid passenger protecting compartments having in front of them collapsible parts to absorb the kinetic energy released in the impact have little advantage in view of the amount of energy involved in high speed head on collisions.

SUMMARY OF THE INVENTION

The purpose of the present invention is therefore to provide a vehicle which is designed to prevent substantial damage to the motor vehicle when involved in a collision with another vehicle thus saving lives and the health of the occupants.

According to the invention, therefore, there is provided a motor vehicle comprising a vehicle body defining a passenger compartment, a pair of front ground wheels and a pair of rear ground wheels for supporting the body for movement across the ground, a front of the vehicle body being formed as a wedge member including a front apex of the wedge member transverse to the vehicle arranged at a height such that it can move underneath a body of a vehicle in collision therewith, one side of the wedge member forming a lower most surface for the front of the vehicle and an opposed side of the wedge member forming a substantially planar ramp surface raising from said apex to a position adjacent a windshield of the vehicle, and structural interconnecting means rearwardly of said apex and extending transversely of said vehicle supporting said ramp surface from said lower most surface to enable said ramp surface to lift and support said vehicle without damage to said ramp surface.

The purpose of the invention is therefore accomplished by avoiding the instantaneous and violent release of kinetic energy contained in a moving vehicle by forcefully changing the direction of the vehicle at the instant of collision.

Thus the front of the vehicle is in the form of a solid wedge one side of which forms the bottom of the vehicle and the second side of which converging to a sharp edge at the front of the vehicle forms a ramp surface at the top of the vehicle. The front edge or apex can be slightly curved and is designed so that in movement of the vehicle it is arranged relatively low to the ground generally lower than the bumper of a conventional vehicle but of course not close enough to touch the road in normal driving. Thus the tendency of the front end of the vehicle, being lower than the body of a vehicle with which it is impacted, is to slide underneath the opposing vehicle.

The upper surface forms therefore the top of a mobile ramp that is capable to lift up or to throw onto one side the other vehicle as the vehicles collide.

The front part of the wedge beneath the ramp is preferably filled with material that is capable to withstand significant compression loads in both the horizontal and vertical directions so that the energy released in the impact is converted into downward force on the ramp and upward force of the opposing vehicle.

The ramp surface is preferably structurally rigid so that it is not distorted during the impact thus enabling the vehicle to continue to be normally used after even a major collision.

The wedge shape at the front of the vehicle with the flat horizontal pan forming the base of the vehicle and the upwardly inclined ramp enables the vehicle as it collides with an opposing vehicle to move downwardly. The vehicle suspension is designed so that the flat pan can move down to the surface of the road without damage to the suspension under the downward forces of the impact. The pan is equipped with skids or rollers which support the weight of both of the vehicles so that when the pan engages the ground it can move forwardly along the ground under the momentum from the vehicle. The kinetic energy contained in both vehicles is thus dissipated in friction with the road surface and in the vertical movement of the vehicles.

If the impacted vehicle is stationary at the time of impact, the stationary vehicle is lifted and then tends to move forwardly with the moving vehicle without significant damage to either.

In the event of a head on collision in which both vehicles are moving, the front edge of the vehicle of the present invention tends to enter the area under the front wheel of the approaching vehicle with the front edge of the wedge shape being forced downwardly to the ground thus forming a solid ramp onto which the opposing vehicle can move. The ramp will then cause the approaching or impacted vehicle to lift to a position in which it can be tilted to one side away from the impact. While the turning of the approaching vehicle onto its side may cause some damage to that vehicle of course that damage will be significantly less than the results of a head on collision in which all of the energy of the moving vehicles is converted into compression of the vehicle parts.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

The vehicle according to the present invention is illustrated in the Figures and comprises a passenger compartment generally indicated at 10 of a conventional nature. The vehicle also includes front wheels 11 and rear wheels schematically indicated at 12 by which the body of the vehicle can move over the ground in normal travel. The engine of the vehicle and transmission are not illustrated for convenience of illustration except that a steering wheel is indicated at 13 connected by conventional steering mechanism to the front wheels 11.

Figure 1:
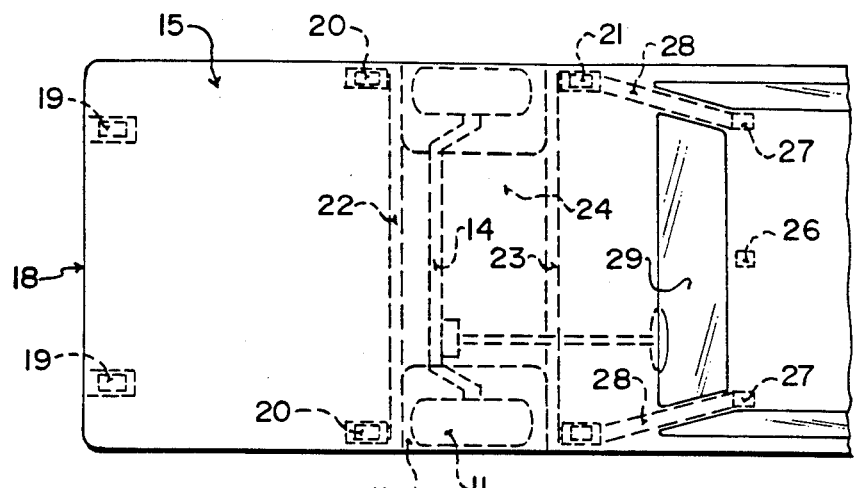
FIG. 1 is a top plan view of a vehicle according to the invention.
Figure 2:
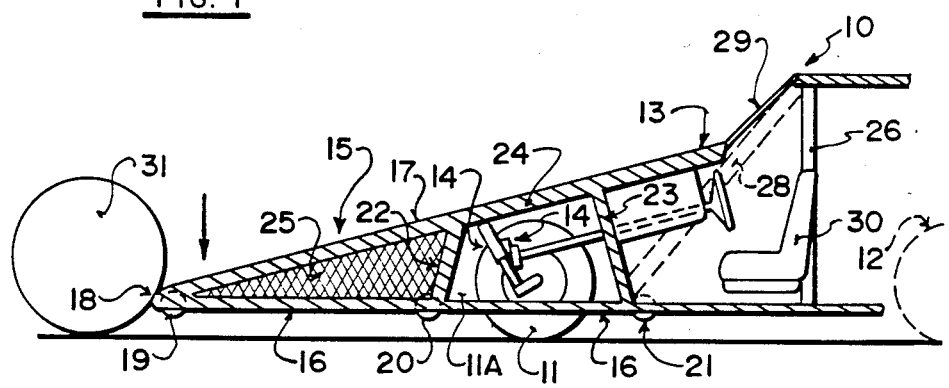
FIG. 2 is a schematic cross sectional view of the vehicle of FIG. 1.

A suspension system for the front wheels is shown schematically in FIG. 1 and indicated at 14.

The front of the vehicle is completely modified from the conventional arrangement in that it comprises a wedge member generally indicated at 15. The wedge member is formed by a rigid lower pan 16 and a rigid structurally complete ramp surface 17 which converge to a front apex 18. The lower pan 16 is generally flat and covers the underside of the vehicle so that it can engage the ground when the vehicle is forced downwardly. Skids or rollers are provided on the pan with for example a roller indicated at 19 at a forward end of the pan adjacent the apex 18. Similar rollers or skids may be mounted at the wheel area at points indicated at 20 and 21 respectively.

The pan is rigidly coupled to the ramp 17 by a pair of plates 22 and 23 which extend across the full width of the vehicle immediately forwardly and rearwardly of the wheel arch indicated at 11A. A transverse plate 24 is welded to the upper edges of the plates 22 and 23 so as to form a rigid support arch extending over the suspension and steering mechanism and defining a compartment therefor. The lower pan 16 extends across beneath the area containing the suspension and steering mechanism. Both the plate 24 and the pan 16 are of reduced width as best shown in FIG. 1 at the area of the wheel arch 11A.

In the area indicated at 25 forwardly of the plate 22 and between the ramp and the pan is provided a rigid structural support substantially free from large cavities so that the support for the ramp has sufficient structural strength to ensure that the ramp is not distorted or collapsed even upon the weight of a heavy vehicle rolling up the ramp 17. For this purpose, honeycomb constructions can be used which provide high structural strength at little weight. In addition, it can be possible to provide a honeycomb support structure which supports strongly a vertical load, but can collapse upon a horizontal load in excess of a predetermined amount, when for example the front apex engages a rigid object such as a wall.

Rearwardly of the wheel arch 11A, there is provided a plurality of struts interconnecting the ramp 17 with the base pan 16, one of the struts being indicated at 26. The strut 26 is provided centrally of the vehicle as shown in Figure 1 and further struts 27 and 28 may be provided for further rigidity.

As shown in the drawings the ramp extends up to a position closely adjacent the head of the passenger in a front seat 30 with a small windshield 29 significantly smaller than conventional arranged at an inclined angle to the ramp so as to extend upwardly therefrom at a position much closer to the driver's head than in a conventional vehicle. In this case the rearward end of the ramp is supported by a roll bar arrangement from the pan and in addition the rear edge of the windshield is supported by a further roll bar provided by vertical struts and a horizontal interconnecting beam. The size of the windshield is such that even if it breaks it will not allow a significant amount of the oncoming vehicle to enter. In addition, the height of the ramp in front of the windshield will cause an oncoming vehicle to topple away from the windshield to one side of the ramp.

Figure 3:
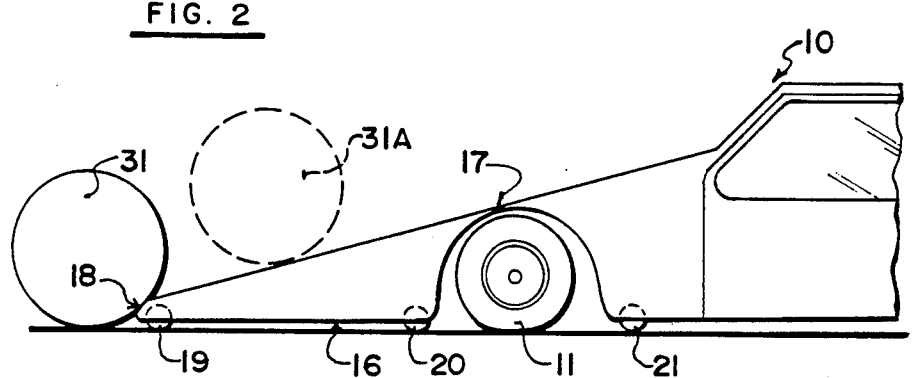
FIG. 3 is a side elevational view of the vehicle of FIG. 1 in an impact situation.

In operation as shown in FIG. 3 the suspension is designed so that when the apex 18 of the vehicle engages a wheel 31 of an oncoming vehicle, the apex is forced downwardly so that the pan 16 engages the ground but continues to move forwardly thereon by virtue of the skids or rollers. The wheel is thus free to roll along the ramp 17 as indicated at 31A so the oncoming vehicle is forced upwardly and over the ramp 17.

In order to assist in forcing the apex 18 downwardly, there may be provided a lever arrangement which engages the oncoming vehicle and then acts in an overcentre manner to force the apex 18 downwardly so as to allow the oncoming vehicle to more readily pass over the apex 18 and continue its movement forward and upwardly while reducing the danger of violent horizontal force on the apex 18.

The vehicle may include a cover (not shown) over the ramp formed of a flexible or collapsible material to provide an aesthetic shape and possibly to support lights.

Since vraious modifications can be made in my invention as hereinabove described, and many apparently wideley different embodiments of same made within the spirit and scope of the claims without departing from such spirit and scope, it is intended that all matter contained in the accompanying specification shall be interpreted as illustrative only and not in a limiting sense.

I claim:

1. A motor vehicle comprising a vehicle body defining a passenger compartment, a pair of front ground wheels and a pair of rear ground wheels for supporting the body for movement across the ground, a front of the vehicle body being formed as a wedge member including a front apex of the wedge member transverse to the vehicle arranged at a lowest height of the body of the vehicle and at a height such that it can move underneath a body of an opposing vehicle in collision therewith, one side of the wedge member forming a lowermost surface for the front of the vehicle at said lowest height of the body and an opposed upper side of the wedge member being formed to define a structurally rigid body having a substantially planar ramp surface raising from said apex to a position adjacent a windshield of the vehicle, and structural interconnecting means rearwardly of said apex and extending transversely of said vehicle support in said ramp surface from said lowermost surface to enable said ramp surface to lift and support said opposing vehicle substantially without damage to said ramp surface.

2. The invention according to claim 1 wherein said interconnecting means forwardly of said front wheels comprises a substantially complete mass free from large cavities.

3. The invention according to claim 1 including suspension means for said pair of front ground wheels on said vehicle, such suspension means being arranged so as to allow downward vertical movement of the front of the vehicle sufficient to allow the apex to engage the ground such that said ramp surface can receive a wheel of said collision vehicle for lifting said wheel from the ground.

4. The invention according to claim 3 wherein said lower surface includes skid means separate from said front wheels for engaging the ground to enable the lower surface to move across the ground.

5. The invention according to claim 4 wherein said skid means comprises a plurality of rollers arranged to roll across the ground and the forward movement of said lower surface relative to the ground.

6. The invention according to claim 1 wherein said interconnecting means includes transverse plate means interconnecting said lower surface and said ramp surface and extending substantially vertically therebetween.

7. The invention according to claim 5 including a pair of plates one of which is arranged immediately forwardly of said front ground wheels and the other of which is arranged immediately rearwardly of said front ground wheels and frame means interconnecting said plates at said ramp surface.

8. The invention according to claim 1 wherein said ramp surface extends rearwardly from said apex beyond said front wheels.

9. The invention according to claim 1 wherein said lower surface comprises a substantially flat pan member extending continously along the underside of the vehicle from the apex to a position rearwardly of the front wheels thereof.

10. The invention according to claim 1 including strut means rearwardly of said front wheels interconnecting said lower surface and said ramp surface.

* * * * *